United States Patent
Iwase

(10) Patent No.: US 10,427,392 B2
(45) Date of Patent: Oct. 1, 2019

(54) FUNCTIONAL COMPOSITE FILM AND QUANTUM DOT FILM

(71) Applicant: FUJIFILM Corporation, Tokyo (JP)

(72) Inventor: Eijiro Iwase, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 65 days.

(21) Appl. No.: 15/657,927

(22) Filed: Jul. 24, 2017

(65) Prior Publication Data

US 2017/0320307 A1 Nov. 9, 2017

Related U.S. Application Data

(63) Continuation of application No. PCT/JP2016/050332, filed on Jan. 7, 2016.

(30) Foreign Application Priority Data

Feb. 2, 2015 (JP) .................................. 2015-018624

(51) Int. Cl.
  *B32B 27/40* (2006.01)
  *B32B 27/30* (2006.01)
  *B32B 9/00* (2006.01)

(52) U.S. Cl.
  CPC ............... *B32B 27/40* (2013.01); *B32B 9/00* (2013.01); *B32B 27/30* (2013.01); *B32B 2307/40* (2013.01); *B32B 2309/105* (2013.01)

(58) Field of Classification Search
  CPC .......... B32B 2307/40; B32B 2309/105; B32B 27/30; B32B 27/40; B32B 9/00

(Continued)

(56) References Cited

U.S. PATENT DOCUMENTS

| 2008/0102262 A1* | 5/2008 | Esaki | B32B 27/36 428/220 |
| 2014/0170345 A1* | 6/2014 | Aoshima | C08J 7/045 428/35.4 |

(Continued)

FOREIGN PATENT DOCUMENTS

| JP | 2008-299218 A | 12/2008 |
| JP | 2011-136430 A | 7/2011 |

(Continued)

OTHER PUBLICATIONS

International Search Report issued in PCT/JP2016/050332 dated Apr. 12, 2016.

(Continued)

*Primary Examiner* — Thao T Tran
(74) *Attorney, Agent, or Firm* — Edwards Neils LLC; Jean C. Edwards, Esq.

(57) ABSTRACT

A functional composite film includes one or more combinations of an inorganic layer and an organic layer as underlying base of the inorganic layer on a support, and having the outermost surface with an organic layer thereon, where the organic layer on the outermost surface is formed using an ultraviolet-curable urethane polymer having a weight-average molecular weight of 5,000 to 30,000 and a double bond equivalent of 300 g/mol or more, which has a urethane polymer as the main chain and a side chain having a (meth)acryloyl group at a terminal; a curable urethane polyester; and at least one phosphoric acid compound containing two or less (meth)acryloyl groups and/or a silane coupling agent containing one (meth)acryloyl group, and a quantum dot film using the same. High adhesiveness is obtained between the organic layer and the inorganic layer, and when a quantum dot layer or the like is laminated thereon.

10 Claims, 1 Drawing Sheet

(58) Field of Classification Search
USPC ........................................................ 428/425.5
See application file for complete search history.

(56) References Cited

U.S. PATENT DOCUMENTS

2015/0378089 A1* 12/2015 Oba ..................... G02B 6/0068
349/70
2017/0320306 A1* 11/2017 Iwase ..................... B32B 27/18

FOREIGN PATENT DOCUMENTS

JP       2013-544018 A    12/2013
WO    2012/064562 A1    5/2012

OTHER PUBLICATIONS

Written Opinion issued in PCT/JP2016/050332 dated Apr. 12, 2016.
International Preliminary Report on Patentability issued by WIPO dated Aug. 17, 2017, in connection with International Patent Application No. PCT/JP2016/050332.

* cited by examiner

FUNCTIONAL COMPOSITE FILM AND QUANTUM DOT FILM

CROSS-REFERENCE TO RELATED APPLICATIONS

This application is a Continuation of PCT International Application No. PCT/JP2016/050332 filed on Jan. 7, 2016, which was published under PCT Article 21(2) in Japanese, and which claims priority under 35 U.S.C. § 119(a) to Japanese Patent Application No. 2015-018624 filed on Feb. 2, 2015. The above applications are hereby expressly incorporated by reference, in their entirety, into the present application.

BACKGROUND OF THE INVENTION

1. Field of the Invention

The present invention relates to a functional composite film which exerts good gas barrier properties and adhesiveness, and a quantum dot film using the functional composite film.

2. Description of the Related Art

A liquid crystal display device has been used widely more and more year by year as a space-saving image display device with low power consumption. Further, recently, as an improvement in performance for liquid crystal display devices, there have been demands for further power saving, enhancement in color reproducibility, and the like. In the following description, a "liquid crystal display device" is also referred to as an "LCD".

It has been proposed to use quantum dots which emit light by conversion of the wavelength of incidence ray in order to enhance light utilization efficiency and improve color reproducibility in response to a demand for power saving with respect to the backlight of an LCD.

Quantum dots are in the state of electrons having a limited moving direction in all three-dimensional directions, and in a case where nanoparticles of a semiconductor are three-dimensionally surrounded by high-potential barriers, these nanoparticles become quantum dots. The quantum dots express various quantum effects. For example, a so-called quantum size effect in which the densities of states (energy levels) of the electrons are discretized is expressed. According to this quantum size effect, the absorption wavelength/emission wavelength of light can be controlled by changing the sizes of the quantum dots.

Generally, such quantum dots are dispersed in a binder formed of resins such as an acrylic resin and an epoxy resin to become a quantum dot layer, which is disposed between a backlight and a liquid crystal panel, and used, for example, as a quantum dot film which performs wavelength conversion.

When excitation light is incident to a quantum dot layer from the backlight, the quantum dots are excited to emit fluorescent light. Here, white light can be realized by emitting light having a narrow half width, such as red light, green light, and blue light, by employing quantum dots having different light emission characteristics. Since the fluorescent light derived from quantum dots has a narrow half width, it is possible to make a design such that the white light obtained by appropriately selecting the wavelength can be designed to have a high brightness or excellent color reproducibility.

However, the quantum dots have problems in that they are easily deteriorated by moisture or oxygen and have a reduction in light emission intensity due to a photo-oxidation reaction. Thus, protection of the quantum dot layer has been carried out by laminating gas barrier films on both surfaces of the quantum dot layer.

For example, JP2013-544018A describes a laminated quantum dot film, in which quantum, dots are protected by sandwiching a quantum dot layer (QD phosphor material film layer) between two gas barrier films, as a backlight unit for use in an LCD or the like.

Furthermore, JP2013-544018A describes a configuration in which an oxide layer expressing gas barrier properties, such as silicon oxide, titanium oxide, and aluminum oxide, is formed on a resin film such as a polyethylene terephthalate (PET) film as gas barrier films having a quantum dot layer sandwiched therebetween.

SUMMARY OF THE INVENTION

In such a laminated quantum dot film, it is preferable that the adhesiveness between the gas barrier film and the quantum dot layer is high.

When the quantum dot film is processed into product forms such as a portable terminal and a display, it is subjected to various types of processing such as slit cutting processing and punching processing. When interlayer peeling occurs in such a processing step, the peeled portion is lack of gas barrier properties. As a result, oxygen or moisture penetrates from the peeled edge, and thus, deterioration of the quantum dot layer from the edge rapidly proceeds.

In the quantum dot layer, resins such as an acrylic resin and an epoxy resin as described above are used as the binder, taking dispersibility of quantum dots, handleability, and the productivity in a case of forming a film into consideration, in many cases.

In contrast, the gas barrier films having the quantum dot layer sandwiched therebetween are required to have a certain degree of high gas barrier properties. As a result, with the organic, compound, desired gas barrier properties are not obtained, and thus, a gas barrier film configured such that an inorganic layer expressing gas barrier properties, such as an inorganic oxide layer, is formed on the surface of a resin film or the like as a support, as shown in JP2013-544018A, is used.

With such the quantum dot layer formed of the organic compound and the gas barrier film having an inorganic layer on the surface thereof, it is difficult to obtain sufficient adhesiveness with respect to various types of processing as described above.

As an improvement of the adhesiveness between the organic compound and the inorganic compound, in general, a pre-treatment using a silane coupling agent can be considered. However, a reaction to allow the silane coupling agent to function requires addition of an acid or an alkali, or heating, and poses a concern about deterioration of quantum dot materials vulnerable to an acid, an alkali, or heat. Incidentally, prior to formation of the quantum dot layer, an application step of applying a silane coupling agent is required, which is thus disadvantageous from the viewpoint of productivity. In addition, the inorganic layer expressing gas barrier properties is damaged due to such the requirement of the step of applying the silane coupling agent, or the more complicated steps, from which there is a possibility that the gas barrier properties are reduced.

Furthermore, there is also a method involving incorporating a silane coupling agent into a composition which forms the quantum dot layer, but in this method, since quantum dots are directly affected by an acid, an alkali, or heat, there is a possibility that the quantum dots are further deteriorated.

An object of the present invention lies in solving such problems in the related art, and is to provide a functional composite film which has good adhesiveness to a functional layer using an organic compound as a binder of a quantum dot layer or the like, and is capable of preventing damages on an inorganic layer mainly expressing a function for imparting gas barrier properties; and a quantum dot film using the functional composite film.

In order to solve these problems, a functional composite film having one or more combinations of an inorganic layer and an organic layer which becomes an underlying base of the inorganic layer on a support, and having the outermost surface with an organic layer thereon, in which the organic layer on the outermost surface is formed using an ultraviolet-curable urethane polymer having a weight-average molecular weight of 5,000 to 30,000 and a double bond equivalent of 300 g/mol or more, which has a urethane polymer as the main chain and a side chain having a (meth)acryloyl group at a terminal; a curable urethane polyester; and at least one of a phosphoric acid compound containing two or less (meth)acryloyl groups or a silane coupling agent containing one (meth)acryloyl group is provided as the functional composite film of the present invention.

In such the functional composite film of the present invention, it is preferable that the thickness of the organic layer on the outermost surface is 10 to 1,000 nm.

Furthermore, it is preferable that the organic layer on the outermost surface includes a photopolymerization initiator.

Incidentally, it is preferable that the organic layer on the outermost surface is formed by thermal curing.

Moreover, it is preferable that the organic layer on the outermost surface includes a lubricant.

Furthermore, it is preferable that the lubricant is a silicon particle.

In addition, it is preferable that the inorganic layer is formed of any one of silicon oxide, silicon nitride, silicon ox nitric aluminum oxide, and a mixture of two or more thereof.

Furthermore, a quantum dot film in which a quantum dot layer formed by dispersing quantum dots in a binder is sandwiched between the functional composite films of the present invention, with the organic layer on the outermost surface being on the inside, is provided as the quantum dot film of the present invention.

In such the quantum dot film of the present invention, the binder is preferably formed by the polymerization of a compound having a weight-average molecular weight of 500 or less.

In addition, the binder is preferably a (meth)acrylic resin.

When such the functional composite film of the present invention has the organic layer on the outermost surface, the adhesiveness to a functional layer having an organic compound as a binder, such as a quantum dot layer, is high, and damages of the inorganic layer that mainly expresses functions such as gas barrier properties can be prevented.

In addition, the quantum dot film of the present invention has high durability by using the functional composite film of the present invention.

DESCRIPTION OF THE PREFERRED EMBODIMENTS

Hereinbelow, the functional composite film and the quantum dot film of the present invention will be described in detail with reference to suitable Examples shown in the accompanying drawings.

Figure 1:
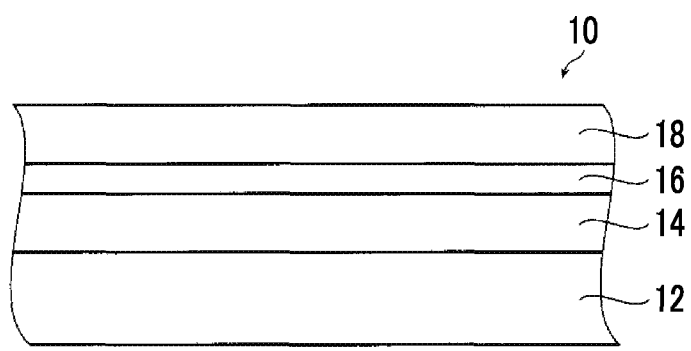
FIG. 1 is a view conceptually showing an example of a functional composite film of the present invention.

FIG. 1 is a view conceptually showing an example in winch a functional composite film of the present invention is used in a gas barrier film.

Further, the functional composite film of the present invention is not limited to the gas barrier film. That is, the present invention can be used in various known functional composite films, including, for example, various optical films such as filters that transmit light at a specific wavelength and antireflection films.

Here, since the functional composite film of the present invention has a surface organic layer on the outermost surface, the inorganic layer can be protected with the surface organic layer and a functional composite film having an inorganic layer with no defects such as lines and cracks can be obtained. In addition, the functional composite film of the present invention can enhance the adhesiveness to the organic compound due to incorporation of a predetermined surface organic layer therein.

Therefore, the functional composite film of the present invention is used in applications for protecting a functional layer formed by dispersing materials vulnerable to moisture in a binder formed of a resin or the like, and is more suitably used in a gas barrier film having significant deterioration of performance due to damage of the inorganic layer or interlayer peeling with a functional layer.

The gas barrier film 10 shown in FIG. 1 is basically configured to have a support 12, an underlying organic layer 14, an inorganic layer 16, and a surface organic layer 18 on the outermost surface.

That is, the gas barrier film 10 shown in FIG. 1 has one combination of the underlying organic layer 14 and the inorganic layer 16. However, the functional composite film of the present invention can also use various configurations other than those above.

For example, the functional composite film may be configured to have two combinations of the underlying organic layer 14 and the inorganic layer 16, and further have the surface organic layer 18 on the outermost surface. Alternatively, it may be configured to have three or more combinations of the underlying organic layer 14 and the inorganic layer 16, and a surface organic layer 18 on the outermost surface.

Alternatively, the functional composite film may be configured to have the inorganic layer 16 formed on the surface of the support 12, and have one or more combinations of the underlying organic layer 14 and the inorganic layer 16 thereon.

That is, in the functional composite film of the present invention, any of various configurations can be used as long as they have an organic/inorganic laminated structure with one or more combinations of an inorganic layer and an organic layer which becomes an underlying base of the inorganic layer, and the organic layer is on the outermost surface.

In the gas barrier film 10, as the support 12, various known materials in a sheet form, which are used as a support in various gas barrier films or various laminated functional films.

Specific suitable examples of the support 12 include films (resin films) formed of various resin materials, such as polyethylene (PE), polyethylene naphthalate (PEN), polyamide (PA), polyethylene terephthalate (PET), polyvinyl chloride (PVC), polyvinyl alcohol (PVA), polyacrylonitrile (PAN), polyimide (PI), transparent polyimide, a methyl polymethacrylate resin (PMMA), polycarbonate (PC), polyacrylate, polymethacrylate, polypropylene (PP), polystyrene (PS), ABS, a cyclic olefinicopolymer (COC), a cycloolefin polymer (COP), and triacetyl cellulose (TAC).

Furthermore, in the present invention, a support having a layer (film) for obtaining various functions, such as a protective layer, an adhesive layer, a light reflecting layer, an antireflection layer, a light shielding layer, a planarizing layer, a buffer layer, and a stress relaxation layer, formed on the surface thereof, is used as the support 12.

In addition, the support 12 preferably has high transmittance to ultraviolet rays.

In the quantum dot film of the present invention, which will be described later, the quantum dot layer is formed by applying a polymerizable composition (curable composition) which becomes the quantum dot layer onto the surface organic layer 18 of the gas barrier film 10, laminating the other gas barrier film, and then curing the polymerizable composition by the irradiation with ultraviolet rays. Accordingly, in order to form the quantum dot layer properly, the support 12 preferably has high transmittance to ultraviolet rays.

The thickness of the support 12 may be appropriately set, depending on applications, forming materials, or the like.

According to the studies of the present inventors, the thickness of the support 12 is preferably 5 to 100 µm, and more preferably 10 to 50 µm.

It is preferable to set the thickness of the support 12 within the above range, for example, in views that the mechanical strength of the gas barrier film 10 is sufficiently secured, and further, the gas barrier film 10 can be lighter, thinner, and flexible. Further, by setting the thickness of the support 12 within the above range, the quantum dot film of the present invention, which will be described later, can be made thinner.

The gas barrier film 10 has an underlying organic layer 14 on the support 12, as an underlying layer of the inorganic layer 16.

The underlying organic layer 14 is a layer formed of organic compounds, which is basically obtained by the polymerization (crosslinking) of monomers or oligomers which become the underlying organic layer 14.

The underlying organic layer 14 of the support 12 functions as an underlying layer for properly forming an inorganic layer 16 that usually expresses gas barrier properties in the gas barrier film 10.

By incorporation of such an underlying organic layer 14, irregularities on the surface of the support 12 (or the inorganic layer formed on the surface of the support 12), foreign substance attached to the surface of the support 12, and the like can be embedded to make the deposition surface of the inorganic layer 16 be in a state which is suitable for forming the inorganic layer 16. Thus, it is possible to remove regions in which it is difficult for an inorganic compound which becomes the inorganic layer 16 to deposit a film, such as irregularities and shadows of foreign substance on the surface of the support 12, thereby forming a proper inorganic layer 16 without gaps on the entire surface of the substrate.

In the gas barrier film 10, the forming materials of the underlying organic layer 14 are not limited, and various known organic compounds can be used.

Suitable examples thereof include thermoplastic resins such as polyesters, (meth)acrylic resins, methacrylic acid-maleic acid copolymers, polystyrene, transparent fluoro resins, polyimide, fluorinated polyimide, polyamide, polyamideimide, polyetherimide, cellulose acylate, polyurethane, polyether ether ketone, polycarbonate, alicyclic polyolefin, polyarylate, polyether sulfone, polysulfone, fluorene ring-modified polycarbonate, alicyclic-modified polycarbonate, fluorene ring-modified polyester, and acrylic compounds; and films of polysiloxane and other organosilicon compounds. A plurality of these compounds may be used in combination.

Among those, the underlying organic layer 14 constituted with polymerized products of radically curable compounds and/or cationically curable compounds having an ether group as a functional group are suitable in views of excellent glass transition temperature or strength, and the like.

Among those, in particular, in views of a low refractive index, high transparency, excellent optical characteristics, and the like, acrylic resins or methacrylic resins having polymers of the monomers or oligomers of acrylate and/or methacrylate as a main component are suitably exemplified as the underlying organic layer 14.

Among those, in particular, acrylic resins or methacrylic resins having bifunctional or higher, in particular, trifunctional or higher polymers of the monomers or the oligomers of acrylate and/or methacrylate as a main component, such as dipropylene glycol di(meth)acrylate (DPGDA), trimethylolpropane tri(meth)acrylate (TMPTA), and dipentaerythritol hexa(meth)acrylate (DMA) are suitably exemplified. Further, it is also preferable that a plurality of these acrylic resins or methacrylic resins are used.

The thickness of the underlying organic layer 14 may be appropriately set, depending on the forming materials of the underlying organic layer 14 or the support 12. According to the studies of the present inventors, the thickness of the underlying organic layer 14 is preferably set to 0.5 to 5 µm, and more preferably set to 1 to 3 µm.

Therefore, by setting the thickness of the underlying organic layer 14 to 0.5 µm or more, the irregularities on the surface of the support 12 or the foreign substance attached to the surface of the support 12 can be embedded to planarize the surface of the underlying organic layer 14, that is, the deposition surface of the inorganic layer 16.

Furthermore, by setting the thickness of the underlying organic layer 14 to 5 µm or less, occurrence of problems such as cracking of the underlying organic layer 14 and curling of the gas barrier film 10, caused by the excessively large thickness of the underlying organic layer 14, can be suitably suppressed.

Moreover, in a case where a plurality of the underlying organic layers 14 are included as described above, the thickness of the respective underlying organic layers 14 may be the same as or different from each other. Further, in a case where a plurality of the underlying organic layers 14 are included, the forming materials of the respective underlying organic layers 14 may be the same as or different from each other.

Such a underlying organic layer 14 may be formed (film formation) by a known method for forming a layer formed of organic compounds, depending on the underlying organic layer 14 to be formed.

By way of an example, the underlying organic layer 14 may be formed by a so-called coating method, which includes preparing a coating composition including a organic solvent, organic compounds (monomers, dimers, trimers, oligomers, polymers, and the like), which become the underlying organic layer 14, a surfactant, and a silane coupling agent; applying and drying the coating composition; and if desired, polymerizing (crosslinking) the organic compounds by the irradiation with ultraviolet rays, or the like.

In addition, the underlying organic layer 14 is preferably formed by a so-called roll-to-roll method. In the following description, the "roll-to-roll" is also referred to as "R-to-R".

As well-known, R-to-R is a production method in which a material on which a film is formed is drawn from a material roll formed by rolling up the material on which a film is formed having a long length into a roll shape, film formation is carried out while the drawn material on which a film is formed is transported in a longitudinal direction, and the material on which a film is formed for film formation is rolled into a roll shape. By using R-to-R, high productivity and production efficiency are obtained.

The inorganic layer 16 is a layer formed of inorganic compounds.

In the gas barrier film 10, the inorganic layer 16 usually expresses the desired gas barrier properties.

The forming materials of the inorganic layer 16 are not limited, and various layers formed of inorganic compounds expressing gas barrier properties can be used.

Specifically, films formed of inorganic compounds including metal oxides such as aluminum oxide, magnesium oxide, tantalum oxide, zirconium oxide, titanium oxide, and indium tin oxide (ITO); metal nitrides such as aluminum nitride; metal carbides such as aluminum carbide; oxides of silicon such as silicon oxide, silicon oxynitride, silicon oxycarbide, and silicon oxynitrocarbide; nitrides of silicon such as silicon nitride and silicon nitrocarbide; carbides of silicon such as silicon carbide; hydrides of these compounds; mixtures of two or more kinds of these compounds; and hydrogenated products thereof are suitably exemplified. Further, a mixture of two or more of these compounds can also be used.

Particularly, silicon nitride, silicon oxide, silicon oxynitride, aluminum oxide, and a mixture of two or more thereof are suitably used since these compounds have high transparency and are capable of expressing excellent gas barrier properties. Among these, in particular, silicon nitride is suitably used since it has high transparency as well as excellent gas barrier properties.

As the film thickness of the inorganic layer 16, a thickness capable of expressing gas barrier properties may be appropriately determined depending on the forming materials. According to the studies of the present inventors, the thickness of the inorganic layer 16 is preferably 10 to 200 nm, more preferably 15 to 100 nm, and particularly preferably 20 to 75 nm.

By setting the thickness of the inorganic layer 16 to 10 nm or more, the inorganic layer 16 that stably expresses sufficient gas barrier performance can be formed. Further, the inorganic layer 16 is generally brittle, and thus, if it is excessively thick, it can cause generation of cracking, lines, peeling, or the like, whereas by setting the thickness of the inorganic layer 16 to 200 nm or less, the generation of cracks can be prevented.

Furthermore, in a case of a plurality of inorganic layers 16 are included as described above, the thickness of the respective inorganic layers 16 may be the same as or different from each other. Further, in a case where a plurality of the inorganic layers 16 are included, the forming materials of the respective inorganic layers 16 may be the same as or different from each other.

In the gas barrier film 10, a film forming method for the inorganic layer 16 is not limited, and various known methods for forming inorganic layers (inorganic films) can be used, depending on the inorganic layer 16 to be formed.

Specifically, the inorganic layer 16 may be formed by vapor-phase film forming methods including plasma CVDs such as CCP-CVD and ICP-CVD, sputtering such as magnetron sputtering and reactive sputtering, and vacuum vapor deposition.

In addition, the inorganic layer 16 is also preferably formed by R-to-R.

In the gas barrier film 10, the surface organic layer 18 which is the outermost surface is placed on the inorganic layer 16.

The surface organic layer 18 is formed to protect the inorganic layer 16 as well as to obtain high adhesiveness to a functional layer formed by dispersing particles expressing functions in a binder formed of organic compounds, such as a quantum dot layer.

It is known that a quantum dot layer is sandwiched between the gas barrier films in order to protect quantum dots vulnerable to moisture as described above.

In order to secure sufficient gas barrier properties, it is necessary that the gas barrier film use an inorganic layer formed of silicon nitride, silicon oxide, and the like. On the other hand, the quantum dot layer is formed by dispersing quantum dots in an acrylic resin or the like. Thus, a laminate having a quantum dot layer sandwiched between gas barrier films has deteriorated adhesiveness between the gas barrier films and the quantum dot layer, and thus, moisture penetrates into the quantum dot layer due to interlayer peeling, which leads to deterioration of the quantum dot layer.

Furthermore, it is possible to secure the adhesiveness by forming a layer including the silane coupling agent, and the like. However, there is a possibility that heat or an acid required to exert the action of the silane coupling agent can give adverse effects on quantum dots, and the inorganic layer can be damaged due to an increased number of steps.

In contrast, the gas barrier film 10 of the present invention has the surface organic layer 18 on the inorganic layer 16. The surface organic layer 18 is an organic layer formed of organic compounds.

Preferably, the surface organic layer 18 is formed by using an ultraviolet-curable urethane polymer having a weight-average molecular weight of 5,000 to 30,000 and a double bond equivalent of 300 g/mol or more, which has a urethane polymer as the main chain and a side chain having a (meth)acryloyl group at a terminal; a curable urethane polyester; and at least one of a phosphoric acid compound containing two or less (meth)acryloyl groups or a silane coupling agent containing one (meth)acryloyl group.

In the following description, "the ultraviolet-curable urethane polymer having a weight-average molecular weight of 5,000 to 30,000 and a double bond equivalent of 300 g/mol or more, which has a urethane polymer as the main chain and a side chain having a (meth)acryloyl group at a terminal" is also referred to as a "UV-curable urethane polymer".

Preferably, the surface organic layer 18 is formed by curing the main chain urethane polymer main chain) of the UV-curable urethane polymer and the curable urethane polyester, using a polymerizable composition including the above compounds. Particularly preferably, the surface organic layer 18 is formed by thermally curing the main chain of the UV-curable urethane polymer and the curable urethane polyester, using a polymerizable composition including the above-mentioned compounds.

The surface organic layer 18 formed of such a UV-curable urethane polymer is configured to be formed by dispersing the phosphoric acid compound and/or the silane coupling agent, containing uncrosslinked (meth)acryloyl groups, in a matrix (netted structure/network) formed from the main chain of the UV-curable urethane polymer and the curable urethane polyester, crosslinked by curing; from the main chains of the UV-curable urethane polymers with each other; and from the curable urethane polyesters with each other.

Furthermore, the terminal (meth)acryloyl group in the side chain of the UV-curable urethane polymer preferably remains uncrosslinked.

As a result, the surface organic layer 18 has the surface in the cured state. Accordingly, the gas barrier film 10 of the present invention, having such a surface organic layer 18, can be wound, and accordingly, it can also suitably be used in R-to-R.

In addition, by incorporation of the surface organic layer 18 having the surface in the cured state, the surface organic layer 18 acts as a protective layer, and therefore, damages on the inorganic layer 16 can also be prevented.

Furthermore, the inorganic layer 16 such as a silicon nitride layer, formed by a vapor-phase film forming method such as plasma CVD has the surface oxidized by the contact with air, and thus, an —OH group or the like is introduced thereto. On the other hand, when the main chain of the UV-curable urethane polymer and the curable urethane polyester are cured, a hydrolysis reaction of the silane coupling agent proceeds. Further, the phosphoric acid compound has an group. Thus, the inorganic layer 16 forms a covalent bond or a hydrogen bond directly with the phosphoric acid compound or the silane coupling agent included in the surface organic layer 18. As a result, the adhesiveness between the inorganic layer 16 and the surface organic layer 18 can also be secured.

Furthermore, the phosphoric acid compound has two or less uncrosslinked (meth)acryloyl groups. On the other hand, the silane coupling agent has one uncrosslinked (meth)acryloyl group. In addition, the terminal (meth)acryloyl group in the side chain of the UV-curable urethane polymer remains uncrosslinked.

As a result, when functional layers such as a quantum dot layer are formed on the surface organic layer 18 of the gas barrier film 10, the uncrosslinked groups of the binder of the functional layer (preferably an uncrosslinked (meth)acryloyl group), the (meth)acryloyl group of the phosphoric acid compound and/or the silane coupling agent, and the terminal (meth)acryloyl group of the side chain of UV-curable urethane polymer are reacted with and bonded to each other by the irradiation with ultraviolet rays, or the like for curing the functional layer, and the adhesiveness between the functional layer and the surface organic layer 18 can also be secured. Further, since the (meth)acryloyl group of the surface organic layer 18 is uncrosslinked and a compound which becomes the binder when the functional layer is formed easily penetrates, the crosslinked structure extending from the inside of the functional layer to the inside of the surface organic layer 18 can be formed. From this viewpoint, the adhesiveness between the functional layer and the surface organic layer 18 can be enhanced. In addition, since the crosslinking proceeds within the surface organic layer 18, the aggregation peeling of the surface organic layer 18, and the like can be prevented.

Furthermore, preferably by forming functional layers only by the irradiation with ultraviolet rays, the adhesiveness between the surface organic layer 18 and the functional layer can be secured, and therefore, deterioration of functional particles such as quantum dots caused by heating can also be prevented as in a case where the adhesiveness is secured with the silane coupling agent.

The UV-curable urethane polymer which forms the surface organic layer 18 is an ultraviolet-curable polymer having a weight-average molecular weight of 5,000 to 30,000 and a double bond equivalent of 300 g/mol or more, which has a urethane polymer as the main chain and a side chain having a meth)acryloyl group at a terminal.

The main chain of the UV-curable urethane polymer is basically a known urethane polymer. Accordingly, it may be one formed by independently polymerizing each of a carbamic ester, a urethane oligomer unit, a urethane polymer unit, and the like, or may be a copolymer of any one of these polymers and other monomers, oligomers, or polymers. Further, the carbamic ester, the urethane oligomer unit, and the urethane polymer unit may be the same as or different from each other.

The side chain bonded to the main chain (urethane polymer main chain) of the UV-curable urethane polymer has a (meth)acryloyl group at a terminal. As this side chain, various types can be used as long as they have a (meth)acryloyl group at a terminal.

Examples of such a side chain include an alkyl group with a linear or branched chain, having a (meth)acryloyl group at a terminal. As the alkyl group with a linear or branched chain, a linear alkyl group having 1 to 6 carbon atoms is preferable, and an n-propyl group, an ethyl group, and a methyl group are more preferably exemplified, with a methyl group being particularly preferable. The side chains having (meth)acryloyl groups at the terminals may all be the same ones or a mixture of different ones.

The UV-curable urethane polymer may have a side chain having no (meth)acryloyl group at a terminal.

Examples of the side chain having no (meth)acryloyl group at a terminal include an alkyl group with a linear or branched chain, an ethylene oxide group, a polyethylene oxide group, a propylene oxide group, and a polypropylene oxide group.

In addition, the side chains having no meth)acryloyl group at the terminals may be all the same ones or a mixture of different ones.

As described above, the UV-curable urethane polymer which forms the surface organic layer 18 preferably has a weight-average molecular weight of 5,000 to 30,000.

When the weight-average molecular weight of the UV-curable urethane polymer is 5,000 or less, the viscosity is low, cissing of a film of the coating composition for forming the surface organic layer 18 easily occurs, and failures such as no acquisition of the surface organic layer 18 having a desired thickness due to evaporation with heating when the surface organic layer 18 is formed are generated.

When the weight-average molecular weight of the UV-curable urethane polymer is more than 30,000, failures such as generation of aggregation peeling in the surface organic layer 18 are generated.

Taking the above-mentioned points into consideration, the weight-average molecular weight of the UV-curable urethane polymer is preferably 10,000 to 27,000.

Furthermore, in the present invention, the weight-average molecular weight (Mw) of various polymers (resins/polymer materials) may be measured as a molecular weight in terms of polystyrene (PS) by means of gel permeation chromatography (GPC). More specifically, the weight-average molecular weight may be determined using HLC-8220 (manufactured by Tosoh Corporation), and using TSKgel Super AWM-H (manufactured by Tosoh Corporation, 6.0 mmID×15.0 cm) and a 10-mmol/L lithium bromide NMP (N-methylpyrrolidinone) solution as an eluent.

As the weight-average molecular weight of polymers and the like, the numeral values described in the catalogues and the like may be used.

The UV-curable urethane polymer which forms surface organic layer 18 preferably has a double bond equivalent (acryl equivalent) of 300 g/mol or more. The double bond equivalent is the weight-average molecular weight (polymer mass) per mole of a polymerizable double bond (that is, a (meth)acryloyl group) included in the UV-curable urethane polymer.

In a case where the double bond equivalent of the UV-curable urethane polymer is less than 300 g/mol, failures such as an extreme increase in the crosslinking density due to an excessive number of double bonds, that is, terminal (meth)acryloyl groups contained in the side chain, and thus, an increase in the internal stress, leading to a cause of curling or a cause of interfacial peeling, may be generated in some cases.

Taking the above-mentioned points into consideration, the double bond equivalent of the UV-curable urethane polymer is preferably 320 g/mol or more.

The upper limit of the double bond equivalent of the UV-curable urethane polymer is not particularly limited. However, if the double bond equivalent is excessively high, there is a possibility that failures such as insufficient crosslinking on the surface organic layer 18, leading to generation of aggregation peeling on the layer, lowered hardness of the surface organic layer 18, deterioration of a function of protecting the inorganic layer 16, and easy generation of defects such as scratches would be generated. Having an excessively high double bond equivalent means that there is an excessively small number of terminal (meth)acryloyl groups included in the side chain.

Taking these points into consideration, the double bond equivalent of the UV-curable urethane polymer is preferably 1,500 g/mol or less, and more preferably 1,200 g/mol or less.

The double bond equivalent of the UV-curable urethane polymer may be measured by a known method.

Furthermore, as the double bond equivalent of the UV-curable urethane polymer, the numeral values described in the catalogues and the like may be used.

As such a UV-curable urethane polymer, for example, commercially available products such as UV Curable Urethane Polymer (ACRIT 8UH series) manufactured by Taisei Fine Chemical Co., Ltd. may be used.

Furthermore, a plurality of UV-curable urethane polymers may be used in combination.

The content of the UV-curable urethane polymer in the polymerizable composition for forming the surface organic layer 18 may be appropriately set, depending on the UV-curable urethane polymer to be used.

According to the studies of the present inventors, the content of the UV-curable urethane polymer is preferably 35% to 55% by mass, and more preferably 40% to 50% by mass, in the solid content of the polymerizable composition. The solid content of the polymerizable composition is a residual fraction after the volatile fractions of the polymerizable compositions have been volatilized.

It is preferable to set the content of the UV-curable urethane polymer to 35% by mass or more, for example, in views that aggregation peeling hardly occurs even when unpolymerized (meth)acryloyl groups are contained.

It is preferable to set the content of the UV-curable urethane polymer to 55% by mass or less, for example, in views that unpolymerized phosphoric acid compounds or silane coupling agents can be sufficiently held, thermally crosslinking materials can also be sufficiently added, and thus, the surface TAC during thermal curing can be suppressed.

The polymerizable composition for forming the surface organic layer 18 includes a curable urethane polyester (polyester urethane).

As the curable urethane polyester, any various known curable urethane polyesters can be used as long as they are thermally curable. In the following description, the "curable urethane polyester" is also referred to as a "urethane polyester".

Therefore, the weight-average molecular weight of the urethane polyester is not particularly limited, and may be appropriately set, depending on the type of the above-mentioned polyurethane.

According to the studies of the present inventors, the weight-average molecular weight of the urethane polyester is preferably 10,000 to 500,000, and more preferably 20,000 to 100,000.

It is preferable to set the weight-average molecular weight of the urethane polyester to 10,000 or more, for example, in views that evaporation of urethane polyesters by heating in the drying step of the polymerizable composition (coating composition) is suppressed, and further, the viscosity of the coating film of the coating composition can be improved to suppress failures such as cissing. Further, the drying step of the polymerizable composition (coating composition) is also a crosslinking step of the UV-curable urethane polymer and the urethane polyester.

It is preferable to set the weight-average molecular weight of the urethane polyester to 500,000 or less, for example, from the viewpoints that the dilution amount, that is, the amount of the dilution solvent, upon the regulation the viscosity of the coating composition can be reduced, and thus, the coating amount can be lowered, or the pot life of the coating composition can be enhanced.

As the urethane polyester, various commercially available products can be used.

Specific examples thereof include VYLON UR series such as VYLON UR1400 manufactured by Toyobo Co., Ltd.

In addition, a plurality of urethane polyesters may be used in combination.

In the polymerizable composition for forming the surface organic layer 18, the content of the urethane polyester may be appropriately set, depending on the UV-curable urethane polymer, the urethane polyester, or the like to be used.

According to the studies of the present inventors, the content of the urethane polyester is preferably 10% to 20% by mass, and more preferably 12% to 17% by mass, in the solid content of the polymerizable composition.

It is preferable to set the content of the urethane polyester to 10% by mass or more, for example, in views that the surface organic layer 18 can be sufficiently cured or the mechanical strength of the surface organic layer 18 can be secured.

It is preferable to set the content of the urethane polymer to 20% by mass or less, for example, in views that the adhesiveness among the surface organic layer 18, the functional layers such as a quantum dot layer, and the inorganic layer 16 can be improved.

The polymerizable composition for forming the surface organic layer 18 further includes a phosphoric acid compound containing two or less (meth)acryloyl groups and/or a silane coupling agent containing one (meth)acryloyl group.

As the phosphoric acid compound containing two or less (meth)acryloyl groups, various known ones can be used. In the following description, the "phosphoric acid compound containing two or less (meth)acryloyl groups" is also referred to as a "phosphoric acid compound".

Specific examples of the phosphoric acid compound include bis[2-(methacryloyloxy)ethyl] and the following compound.

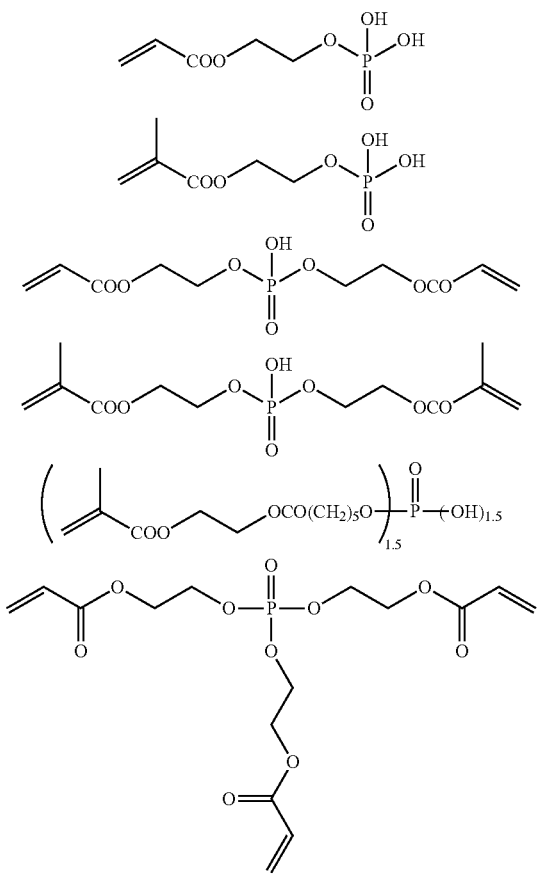

Furthermore, as the phosphoric acid compound, commercially available compounds such as KAYAMER series manufactured by Nippon Kayak Co., Ltd., and Phosmer series manufactured by Uni-Chemical Co., Ltd. may be used.

Similarly, as the silane coupling agent containing one (meth)acryloyl group, various known ones can be used. In the following description, a "silane coupling agent containing one (meth)acryloyl group" is also referred to as a "silane coupling agent".

Specific examples of the silane coupling agent include 3-acryloxypropyl trimethoxysilane. Further, as the silane coupling agent, commercially available products such as KBM-5103, KBM-502, KBM-503, KBE-502, KBE-503, and the like manufactured by Shin-Etsu Silicone Co., Inc. can also be used. A plurality of the silane coupling agents may be used in combination.

As the phosphoric acid compound, those having a molecular weight of 200 to 400 is preferably used. As the silane coupling agent, those having a molecular weight of 200 to 300 are preferably used.

It is preferable to set the molecular weights of the phosphoric acid compound and the silane coupling agent within the above range, for example, in views that the phosphoric acid compound antler the silane coupling agent can suitably be dispersed within a matrix formed by the UV-curable polyurethane and the urethane polyester.

In the polymerizable composition for forming the surface organic layer 18, the content of the phosphoric acid compound and/or the silane coupling agent may be appropriately set, depending on the UV-curable urethane polymer, the urethane polyester, or the like to be used.

According to the studies of the present inventors, the content of the phosphoric acid compound and/or the silane coupling agent is preferably 5% to 40% by mass, and more preferably 10% to 35% by mass in the solid content of the polymerizable composition.

It is preferable to set the content of the phosphoric acid compound and/or the silane coupling agent to 5% by mass or more, for example, in views that the adhesiveness between functional layers such as a quantum dot layer and the inorganic layer 16 can be improved.

It is preferable to set the content of the phosphoric acid compound and/or the silane coupling agent to 40% by mass or less, for example, in views that the surface organic layer 18 can be sufficiently cured or the blocking due to the bleeding into the back side of the support 12 at the time of winding with R-to-R or the like can be prevented.

Here, the surface organic layer 18 may use the phosphoric acid compound alone or the silane coupling agent alone, or may use a combination of the phosphoric acid compound and the silane coupling agent.

For example, in a case where the inorganic layer 16 is silicon nitride, use of the silane coupling agent alone can enhance the adhesiveness between the inorganic layer 16 and the surface organic layer 18. Further, in a case where the inorganic layer 16 is aluminum oxide, use of the phosphoric acid compound alone can enhance the adhesiveness between the inorganic layer 16 and the surface organic layer 18. Accordingly, selection of either the phosphoric acid compound or the silane coupling agent may be performed, depending on the forming materials of the inorganic layer 16 in the underlayer.

Here, the gas barrier film 10 of the present invention is used in, for example, applications in which a functional layer such as a quantum dot layer is sandwiched between two gas barrier films to prevent deterioration of the functional layer due to moisture, oxygen, or the like. At this time, the gas barrier film 10 is disposed such that the surface organic layer 18 faces the quantum dot layer or the like. Further, by way of an example, the functional layer is configured to be formed by dispersing functional materials such as quantum dots in a binder.

In a case where the surface organic layer 18 contains a phosphoric acid compound, depending on the binder of the functional layer to be sandwiched, higher adhesiveness may be obtained in some cases, and in a case where the surface organic layer 18 contains a silane coupling agent, higher adhesiveness may be obtained in some cases. Accordingly, it is preferable to incorporate both the phosphoric acid compound and the silane coupling agent into the surface organic layer 18, in views that good adhesiveness can be obtained with respect to the functional layers using various binders.

The surface organic layer 18 preferably contains a photopolymerization initiator.

As will be described later, the quantum dot film of the present invention is preferably formed by preparing the two gas barrier films 10, for example, applying a polymerizable composition containing quantum dots onto the surface organic layer 18 of one gas barrier films 10, and then laminating the other gas barrier film 10 thereon, with the surface organic layer 18 facing the polymerizable composition, and curing the polymerizable composition by performing drying and irradiation with ultraviolet rays. Further, it is thought that the gas barrier film 10 of the present invention may be used in a functional laminated film which is manufactured in the same manner, in addition to the quantum dot film, in many cases.

During the curing by the irradiation with ultraviolet rays, the UV-curable urethane polymer having a (meth)acryloyl group, the phosphoric acid compound, and the silane coupling agent, included in the surface organic layer 18, are crosslinked. At this time, by incorporation of the photopolymerization initiator into the surface organic layer 18, the crosslinking within this surface organic layer 18 more suitably proceeds, and thus, the adhesiveness among the functional layer, the inorganic layer 16, and the surface organic layer 18 can be improved. In addition, the dose of ultraviolet rays to be irradiated during the formation of the functional layers such as a quantum dot layer can also be reduced.

As the photopolymerization initiator, various known ones can be used. Specific suitable examples thereof include commercially available products such as IRGACURE series (for example, IRGACURE 651, IRGACURE 754, IRGACURE 184, IRGACURE 2959, IRGACURE 907, IRGACURE 369, IRGACURE 379, and IRGACURE 819) commercially available from BASF, DAROCUR series (for example, DAROCURE TPO and DAROCURE 1173), QUANTACURE PDO, and ESACURE series (for example, ESACURE TZM, ESACURE TZT, and ESACURE KTO46) commercially available from Lamberti SpA.

In addition, the amount of the photopolymerization initiator to be added may be appropriately set, depending on the photopolymerization initiator to be used, and the like. Specifically, the amount of the photopolymerization initiator to be added is preferably 0.5% to 4% by mass, and more preferably 1% to 3% by mass, in the solid content of the polymerizable composition.

The surface organic layer 18 preferably contains a lubricant.

As described above, the gas barrier film 10 of the present invention can suitably correspond to production by R-to-R as well as the production of a functional laminated film such as a wavelength conversion film by R-to-R.

Here, as will be described in detail later, since the surface organic layer 18 is formed by a coating method, it has a very high surface smoothness. As a result, depending on the forming materials of the surface organic layer 18, the films are adhered to each other during the winding, and unwinding may not be smoothly carried out in some cases.

In contrast, by incorporation of the lubricant into the surface organic layer 18, it is possible to stably facilitate winding or unwinding, when corresponding to R-to-R.

As the lubricant, various known lubricants (matting agents) such as oleic acid amide and silicon oxide particles can be used. Among those, silicon particles are suitably used. Among those, silicon particles having a particle diameter of approximately 5 to 30 nm are suitably used. These silicon particles have an effect of imparting very high lubricating properties with the addition of a small amount of the particles, which are thus preferable.

The amount of the lubricant to be added may be appropriately set, depending on the lubricants. For example, with the silicon particles having a particle diameter of approximately 5 to 30 nm, the amount of the silicon particles may be set to approximately 0.0005 to 0.005 $g/m^2$, and preferably approximately 0.001 $g/m^2$, depending on the desired thickness of the surface organic layer.

Furthermore, the components such as the UV-curable urethane polymer, the curable urethane polyester, the phosphoric acid compound, and the silane coupling agent, which become the forming materials of the surface organic layer 18, can be detected by analyzing the surface organic layer 18 and interpreting the analysis results by known methods.

The thickness of the surface organic layer 18 may be appropriately set, depending on the forming materials of the surface organic layer 18, the thickness or the size of the gas barrier film 10, the applications of the gas barrier film, or the like.

According to the studies of the present inventors, the thickness of the surface organic layer 18 is preferably 10 to 1,000 nm, and more preferably 50 to 500 nm.

It is preferable to set the thickness of the surface organic layer 18 to 10 nm or more, for example, in views that the inorganic layer 16 can suitably be protected.

It is preferable to set the thickness of the surface organic layer 18 to 1,000 nm or less, for example, in views that the gas barrier film 10 can be prevented from being unnecessarily thickened or maintain a low internal stress to realize high adhesiveness.

Such a surface organic layer 18 may be formed by a known method for forming layer formed of organic compounds, depending on the forming materials of the surface organic layer 18, or the like.

By way of an example, the surface organic layer 18 may be formed by a coating method. That is, first, a coating composition (polymerizable composition) which includes an organic solvent, and the UV-curable urethane polymer, the urethane polyester, and the phosphoric acid compound, and/or the silane coupling agent as described above, or farther including a photopolymerization initiator and/or a lubricant, is prepared. To this coating composition, a thermal polymerization initiator and the like may be added, if desired.

Subsequently, this coating composition is applied onto the surface of the inorganic layer 16, and the coating composition is heated and dried. Coating and heating may be carried out by known methods.

When heating and drying the coating composition, the main chain of the UV-curable urethane polymer and the urethane polyester are crosslinked and cured, and the sufficiently cured surface organic layer 18, in which a phosphoric acid compound and/or a silane coupling agent, containing an uncrosslinked (meth)acryloyl group, is dispersed in a matrix formed by the main chain of the UV-curable urethane polymer and the urethane polyester, by the UV-curable urethane polymers with each other, and by the urethane polyesters with each other, as described above, is formed. Further, by this heating, the hydrogen bonding or the covalent bonding between the phosphoric acid compound and/or the silane coupling agent, and the —OH group on the surface of the inorganic layer 16 proceeds, and thus, the inorganic layer 16 is adhered to the surface organic layer 18 with high adhesive force. In addition, in a case where the coating composition includes the silane coupling agent, the hydrolysis of the silane coupling agent also proceeds by such heating.

The drying temperature of the coating composition which forms the surface organic layer 18 may be appropriately set, depending on the components of the coating composition, or the like.

According to the studies of the present inventors, the drying temperature of the coating composition is preferably 90° C. to 150° C. It is preferable to set the drying temperature of the coating composition within the above range, for example, in views that the curing of the main chain of the UV-curable urethane polymer and the urethane polyester can sufficiently proceed, deterioration of the components contained in the coating composition can be prevented, or deterioration of the support 12 can be prevented.

Furthermore, if desired, after drying the coating composition, a heating step for sufficiently curing the main chain of the UV-curable urethane polymer and the urethane polyester may be carried out. The heating temperature in the heating step may be set in the same manner as the drying of the coating composition.

The formation of such the surface organic layer 18 is also preferably carried out by R-to-R.

Figure 2:
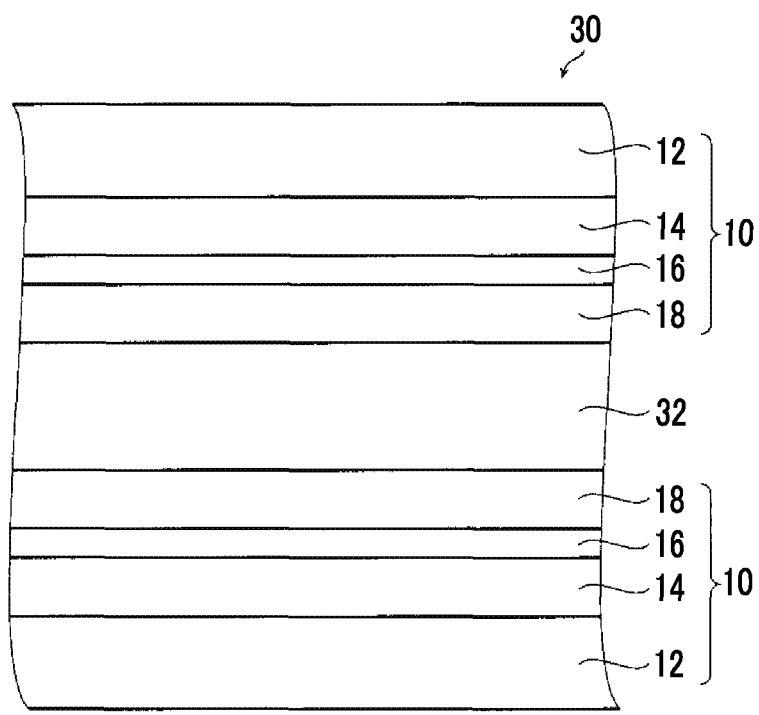
FIG. 2 is a view conceptually showing an example of a quantum dot film of the present invention.

FIG. 2 conceptually shows an example of the quantum dot film of the present invention, using such the gas barrier film 10 of the present invention.

Furthermore, the quantum dot film 30 shown in FIG. 2 is a functional laminated film formed by sandwiching a quantum dot layer 32 as a functional layer between the gas barrier films 10 of the present invention, in which the gas barrier films 10 (functional composite films) of the present invention can be used in various functional laminated films, in addition to the quantum dot film.

Examples thereof include a functional laminated film having an organic electroluminescent layer (organic EL layer) and the like as the functional layer.

The quantum dot film 30 is formed by sandwiching the quantum dot layer 32 between the two gas barrier films 10, facing the surface organic layer 18, in other words, the quantum dot film 30 is formed by sandwiching the quantum dot layer 32 between the two gas barrier films 10 facing the surface organic layer 18.

The quantum dot layer 32 is formed by dispersing quantum dots in a binder (matrix) such as a resin. The quantum dot layer 32 has a function of converting the wavelength of the incidence ray to emit the light.

For example, when blue light emitted from a backlight not shown is incident on the quantum dot layer 32, the quantum dot layer 32 converts the wavelength of at least a part of the blue light into red light or green light by the effect of the quantum dot contained inside to emit the light.

The blue light is light having a central light emission wavelength in a wavelength range of 400 nm to 500 nm, the green light is light having a central light emission wavelength in a wavelength range of 500 nm to 600 nm, and the red light is light having a central light emission wavelength in a wavelength range of more than 600 nm to 680 nm or less.

In addition, the function of the wavelength conversion expressed by the quantum dot layer is not limited to a configuration for the wavelength conversion from blue light to red light or green light, and may be any of functions that convert at least a part of incidence ray into light having a different wavelength.

The quantum dot is at least excited by incident excitation light to emit fluorescent light.

The type of the quantum dot contained in the quantum dot layer is not particularly limited, and various known quantum dots may be appropriately selected, depending on desired performance of wavelength conversion, and the like.

With regard to the quantum dots (quantum dot materials), reference can be made to, for example, paragraph Nos. [0060] to [0066] of JP2012-169271A, but the quantum dots are not limited thereto. Further, as the quantum dot, a commercialized product can be used without any limitation. The light emission wavelength of the quantum dots can be typically adjusted by the composition and/or the size of the particle.

The quantum dots may be used singly or in combination of two or more kinds thereof. In a case of using the quantum dots in combination of two or more kinds thereof, two or more kinds of quantum dots having different wavelengths of the emitted light may be used.

Specifically, examples of known quantum dots include a quantum dot (A) having a center light emission wavelength in the wavelength range in a range of 600 nm to 680 nm, a quantum dot (B) having a center light emission wavelength in the wavelength range in a range of 500 nm to 600 nm, and a quantum dot (C) having a center light emission wavelength in the wavelength range in a range of 400 nm to 500 nm, and the quantum dot (A) is excited by excitation light to emit red light, the quantum dot (B) is excited by excitation light to emit green light and the quantum dot (C) is excited by excitation light to emit blue light. For example, when blue light is incident as excitation light on a quantum dot-containing laminate including the quantum dot (A) and the quantum dot (B), red light emitted from the quantum dot (A), green light emitted from the quantum dot (B) and blue light penetrating through the quantum dot layer can realize white light. Alternatively, ultraviolet light can be incident as excitation light on a quantum dot layer including the quantum dots (A), (B), and (C), thereby making it possible to realize white light with red light emitted from the quantum dot (A), green light emitted from the quantum dot (B) and blue light emitted from the quantum dot (C).

Moreover, as the quantum dot, a so-called quantum rod which emits polarized light with directivity in a rod shape may be used.

The quantum dots are preferably dispersed uniformly in the binder, but may be unevenly dispersed in the binder.

The type of the binder of the quantum dot layer 32 is not particularly limited, but various resins that are used as known quantum dot layers can be used.

Examples thereof include polyester-based resins (for example, polyethylene terephthalate and polyethylene naphthalate), (meth)acrylic resins, polyvinyl chloride-based resins, and polyvinyl chloride-based resins.

Alternatively, as the binder, those formed by curing (polymerizing/crosslinking) a curable compound (polymerizable compound (polymerizable monomer)) having one or more polymerizable groups (crosslinkable groups) can be used. In addition, the polymerizable groups of the curable compound substances having two or more polymerizable groups may be the same as or different from each other.

The type of the polymerizable group is not particularly limited, but the polymerizable group is preferably a (meth)acryloyl group, a vinyl group, or an epoxy group, more preferably a (meth)acryloyl group, and still more preferably an acryloyl group. That is, in the present invention, the binder of the quantum dot layer 32 is preferably a meth acrylic resin, and more preferably an acrylic resin.

As described above, in the gas barrier film 10 of the present invention, the surface organic layer 18 includes a urethane polymer, and a phosphoric acid compound and/or a silane coupling agent. The urethane polymer, and the phosphoric acid compound and/or the silane coupling agent all contain an uncrosslinked (meth)acryloyl group.

Accordingly, by forming the quantum dot layer 32 by curing a curable compound containing a (meth)acryloyl group as the polymerizable group, the (meth)acryloyl group in the quantum dot layer 32 and the (meth)acryloyl group in the surface organic layer 18 are suitably reacted with each other and crosslinked during the curing of the quantum dot layer 32, and thus, the adhesiveness between the surface organic layer 18 and the quantum dot layer 32 can be improved.

Moreover, the curable compound which forms the quantum dot layer 32 preferably has a molecular weight of 500 or less.

It is preferable to form the quantum dot layer 32, using the curable compound having a molecular weight of 500 or less, for example, in views that the curable compound easily enters the matrix structure in the above-mentioned surface organic layer 18, and thus, the adhesiveness between the surface organic layer 18 and the quantum dot layer 32 can be improved.

In the quantum dot layer 32, specifically, for example, a resin formed by curing a curable composition including a first curable compound and a second curable compound, which will be described below, can be used as the binder.

The first curable compound is preferably one or more compounds selected from bifunctional or higher (meth)acrylate monomers and monomers having two or more functional groups selected from the group consisting of an epoxy group and an oxetanyl group.

Preferred examples of the bifunctional (meth)acrylate monomers among the bifunctional or higher (meth)acrylate monomers include neopentyl glycol di(meth)acrylate, 1,9-nonanediol di(meth)acrylate, tripropylene glycol di(meth)acrylate, ethylene glycol di(meth)acrylate, tetraethylene glycol di(meth)acrylate, hydroxypivalic acid neopentyl glycol di(meth)acrylate, polyethylene glycol di(meth)acrylate, dicyclopentenyl (meth)acrylate, dicyclopentenyloxyethyl (meth)acrylate, and dicyclopentanyl di(meth)acrylate.

Furthermore, preferred examples of the trifunctional or higher (meth)acrylate monomers among the bifunctional or higher (meth)acrylate monomers include ECH-modified glycerol tri(meth)acrylate, EO-modified glycerol tri(meth)acrylate, PO-modified glycerol tri(meth)acrylate, pentaerythritol triacrylate, pentaerythritol tetraacrylate, EO-modified phosphoric acid triacrylate, trimethylolpropane tri(meth)acrylate, caprolactone-modified trimethylolpropane tri(meth)acrylate, EO-modified trimethylolpropane tri(meth)acrylate, PO-modified trimethylolpropane tri(meth)acrylate, tris(acryloxyethyl)isocyanurate, dipentaerythritol hexa(meth)acrylate, dipentaerythritol penta(meth)acrylate, caprolactone-modified dipentaerythritol hexa(meth)acrylate, dipentaerythritol hydroxypenta(meth)acrylate, alkyl-modified dipentaerythritol penta(meth)acrylate, dipentaerythritol poly(meth)acrylate, alkyl-modified dipentaerythritol tri(meth)acrylate, ditrimethylolpropane tetra(meth)acrylate, pentaerythritolethoxy tetra(meth)acrylate, and pentaerythritol tetra(meth)acrylate.

As the monomer having two or more functional groups selected from the group consisting of an epoxy group and an oxetanyl group, for example, aliphatic cyclic epoxy compound, bisphenol A diglycidyl ether, bisphenol F diglycidyl ether, bisphenol S diglycidyl ether, brominated bisphenol A diglycidyl ether, brominated bisphenol F diglycidyl ether, brominated bisphenol S diglycidyl ether, hydrogenated bisphenol A diglycidyl ether, hydrogenated bisphenol F diglycidyl ether, hydrogenated bisphenol S diglycidyl ether, 1,4-butanediol diglycidyl ether, 1,6-hexanediol diglycidyl ether, glycerin triglycidyl ether, trimethylolpropane triglycidyl ether, polyethylene glycol diglycidyl ether, and polypropylene glycol diglycidyl ethers; polyglycidyl ethers of polyetherpolyols obtained by adding one kind or two or more kinds of alkylene oxides to aliphatic polyhydric alcohols such as ethylene glycol, propylene glycol, and glycerin; diglycidyl esters of aliphatic long-chain dibasic acids; glycidyl esters of higher fatty acids; and compounds including epoxycycloalkane are suitably used.

Examples of commercially available products which can suitably be used as the monomer having two or more functional groups selected from the group consisting of an epoxy group and an oxetanyl group include CELLOXIDE 2021 P and CELLOXIDE 8000, both manufactured by Daicel Corporation, and 4-Vinylcyclohexene Dioxide manufactured by Sigma Aldrich. These can be used singly or in combination of two or more kinds thereof.

Furthermore, a method for producing the monomer having two or more functional groups selected from the group consisting of an epoxy group and an oxetanyl group is not limited, but can be synthesized with reference to, for example, 20 Organic Synthesis II in Experimental Chemistry Series $4^{th}$ ed., 213 to, 1992, Japan Chemical Society Ed., Maruzen Publ. Co., Ed. by Alfred Hasfner, The chemistry of heterocyclic compounds-Small Ring Heterocycles part3 Oxiranes, John & Wiley and Sons, An Interscience Publication, New York, 1985, Yosimura, Adhesion, Vol. 29, No. 12, 32, 1985, Yoshimura, Adhesion, Vol. 30, No. 5, 42, 1986, Yoshimura, Adhesion, Vol. 30, No. 7, 42, 1986, JP1999-100378A (JP-H11-100378A), JP2906245B, JP2926262B, and the like.

The second curable compound has a functional group having hydrogen bonding properties in the molecule, and a polymerizable group capable of performing a polymerization reaction with the first curable compound.

Examples of the functional group having hydrogen bonding properties in the molecule include a urethane group, a urea group, and a hydroxyl group.

The polymerizable group capable of performing a polymerization reaction with the first curable compound may be a (meth)acryloyl group when the first curable compound is a bifunctional or higher (meth)acrylate monomer. Further, the polymerizable group capable of performing a polymerization reaction with the first curable compound may be an epoxy group or an oxetanyl group when the first curable compound is the monomer having two or more functional groups selected from the group consisting of an epoxy group and an oxetanyl group.

The (meth)acrylate monomer containing a urethane group is a monomer or oligomer obtained by reacting a diisocyanate such as TDI, MDI, HDI, IPDI, and HMDI with a polyol such as polypropylene oxide)diol, poly(tetramethylene oxide)diol, ethoxylated bisphenol A, ethoxylated bisphenol S spiroglycol, caprolactone-modified diol, and carbonate diol, and a hydroxyacrylate such as 2-hydroxyethyl (meth)acrylate, 2-hydroxypropyl (meth)acrylate, glycidol di(meth)acrylate, and pentaerythritol triacrylate, and examples thereof include polyfunctional urethane monomers described in JP2002-265650A, JP2002-355936A, JP2002-067238A, and the like. Specific examples of the urethane acrylate include, but are not limited to, an adduct of TDI and hydroxyethyl acrylate, an adduct of IPDI and hydroxyethyl acrylate, an adduct of HDI and pentaerythritol triacrylate (PETA), a compound obtained by preparing an adduct of TDI and PETA and reacting the remaining isocyanate with dodecyloxyhydroxypropyl acrylate, an adduct of 6,6-nylon and TDI, and an adduct of pentaerythritol, TDI, and hydroxyethyl acrylate.

Examples of the commercially available products which can suitably be used as the (meth)acrylate monomer containing a urethane group include AH-600, AT-600, UA-306H, UA-306T, UA-306I, UA-510H. UF-8001G, and DAUA-167, all manufactured by Kyoeisha Chemical Co., Ltd., UA-160TM manufactured by Shin-Nakamura Chemical Co., Ltd., and UV-4108F and UV-4117F, both manufactured by Osaka Organic Chemical Industry Ltd. These can be used singly or in combination of two or more kinds thereof.

Examples of the (meth)acrylate monomer containing a hydroxyl group include compounds synthesized by the reaction of a compound having an epoxy group with a (meth) acrylic acid. Typically, the compounds are classified into ones of a bisphenol A type, a bisphenol S type, a bisphenol F type, an epoxidized oil type, a novolac type of phenol, and an alicyclic type phenol for the compounds having an epoxy group. Specific examples thereof include, but not limited to, a (meth)acrylate obtained by reacting an adduct of bisphenol A and epichlorohydrin with (meth)acrylic acid, a (meth) acrylate obtained by reacting phenol novolac with epichlorohydrin, and then with (meth)acrylic acid, a (meth)acrylate obtained by reacting an adduct of bisphenol S and epichlorohydrin with (meth)acrylic acid, and a (meth)acrylate obtained by reacting an epoxidized soy bean oil with (meth) acrylic acid. In addition, other examples of the (meth) acrylate monomer containing a hydroxyl group include (meth)acrylate monomers having a carboxyl group or a phosphoric acid group at a terminal.

Examples of the commercially available products which can suitably be used as the second curable compound containing a hydroxyl group include Epoxy Ester, M-600A, 40EM, 70PA, 200PA, 80MFA, 3002M, 3002A, 3000MK, and 3000A, all manufactured by Kyoeisha Chemical Co., Ltd., 4-Hydroxybutyl Acrylate manufactured by Nippon Kasei Chemical Co., Ltd., Monofunctional Acrylate A-SA and Monofunctional Methacrylate SA, both manufactured by Shin-Nakamura Chemical Co., Ltd., Monofunctional Acrylate β-Carboxyethyl Acrylate manufactured by Daicel-Allnex Ltd, and JPA-514 manufactured by Johoku Chemical Co, Ltd. These can be used singly or in combination of two or more kinds thereof.

The mass ratio of the first curable compound to the second curable compound may be 10:90 to 99:1, and is preferably 10:90 to 90:10. It is preferable that the content of the first curable compound is larger than that of the second curable compound, and specifically, the ratio of (the content of the first curable compound)/(the content of the second curable compound) is preferably 2 to 10.

In a case of using a resin formed by curing the first curable compound and the second curable compound as the binder, it is preferable that a monofunctional (meth)acrylate monomer is further included as the curable composition. Examples of the monofunctional (meth)acrylate monomer include acrylic acids and methacrylic acids, and derivatives thereof, and more specifically monomers having one polymerizable unsaturated bond ((meth)acryloyl groups) of a (meth)acrylic acid in the molecule. Specific examples thereof include the following compounds, but the present invention is not limited thereto:

alkyl (meth)acrylates with an alkyl group having 1 to 30 carbon atoms, such as methyl (meth)acrylate, n-butyl (meth)acrylate, isobutyl (meth)acrylate, 2-ethylhexyl (meth)acrylate, isononyl (meth)acrylate, n-octyl (meth)acrylate, lauryl (meth)acrylate, and stearyl (meth)acrylate; arylalkyl (meth)acrylates with an arylalkyl group having 7 to 20 carbon atoms, such as benzyl (meth)acrylate; alkoxyalkyl (meth)acrylates with an alkoxyalkyl group having 2 to 30 carbon atoms, such as butoxyethyl (meth)acrylate; aminoalkyl (meth)acrylate with a (mono-alkyl or di-alkyl) aminoalkyl group having 1 to 20 carbon atoms in total, such as N,N-dimethylaminoethyl (meth)acrylate; (meth)acrylates of polyalkylene glycol alkyl ether with an alkylene chain having 1 to 10 carbon atoms and a terminal alkyl ether having 1 to 10 carbon atoms, such as (meth)acrylate of diethylene glycol ethyl ether, (meth)acrylate of triethylene glycol butyl ether, (meth)acrylate of tetraethylene glycol monomethyl ether, (meth)acrylate of hexaethylene glycol monomethyl ether, monomethyl ether (meth)acrylate of octaethylene glycol, monomethyl ether (meth)acrylate of nonaethylene glycol, monomethyl ether (meth)acrylate of dipropylene glycol, monomethyl ether (meth)acrylate of heptapropylene glycol, and monoethyl ether (meth)acrylate of tetraethylene glycol; (meth)acrylates of polyalkylene glycol aryl ether with an alkylene chain having 1 to 30 carbon atoms and a terminal aryl ether having 6 to 20 carbon atoms, such as (meth)acrylate of hexaethylene glycol phenyl ether; (meth)acrylate having 4 to 30 carbon atoms in total, having an alicyclic structure, such as cyclohexyl (meth)acrylate, dicyclopentanyl (meth)acrylate, isobornyl (meth)acrylate, and methylene oxide adduct cyclodecatriene (meth)acrylate; fluorinated alkyl (meth)acrylates having 4 to 30 carbon atoms in total, such as heptadecafluorodecyl (meth)acrylate; (meth)acrylates having a hydroxyl group, such as 2-hydroxyethyl (meth)acrylate, 3-hydroxypropyl (meth)acrylate, 4-hydroxybutyl (meth)acrylate, mono(meth)acrylate of triethylene glycol, tetraethylene glycol mono(meth)acrylate, hexaethylene glycol mono(meth)acrylate, octapropylene glycol mono(meth)acrylate, and mono- or di-(meth)acrylate of glycerol; (meth)acrylates having a glycidyl group such as glycidyl (meth)acrylate; polyethylene glycol mono(meth) acrylates with an alkylene chain having 1 to 30 carbon atoms such as tetraethylene glycol mono(meth)acrylate, hexaethylene glycol mono(meth)acrylate, and octapropylene glycol mono(meth)acrylate; and (meth)acrylamides such as (meth)acrylamide, N,N-dimethyl (meth)acrylamide, N-isopropyl (meth)acrylamide, 2-hydroxyethyl (meth)acrylamide, and acryloylmorpholine.

The monofunctional (meth)acrylate monomers are included in an amount of preferably 1 to 300 parts by mass, and more preferably 50 to 150 parts by mass, with respect to 100 parts by mass of the total mass of the first curable compound and the second curable compound.

Furthermore, compounds containing a long-chain alkyl group having 4 to 30 carbon atoms are preferably included. Specifically, it is preferable that at least one of the first curable compound, the second curable compound or the monofunctional (meth)acrylate monomer contains a long-chain alkyl group having 4 to 30 carbon atoms. The long-chain alkyl group is more preferably a long-chain alkyl group having 12 to 22 carbon atoms since the dispersibility of quantum dots is improved. The more the dispersibility of quantum dots is enhanced, the more the amount of light advancing directly from a light conversion layer to the light emission surface is increased, which is effective for improving a front brightness and a front contrast.

Specifically, as the monofunctional (meth)acrylate monomer containing a long-chain alkyl group having 4 to 30 carbon atoms, butyl (meth)acrylate, octyl (meth)acrylate, lauryl (meth)acrylate, oleyl (meth)acrylate, stearyl (meth)acrylate, behenyl (meth)acrylate, butyl (meth)acrylamide, octyl (meth)acrylamide, lauryl (meth)acrylamide, oleyl (meth)acrylamide, stearyl (meth)acrylamide, behenyl (meth)acrylamide, and the like are preferable. Among these, lauryl (meth)acrylate, oleyl (meth)acrylate, and stearyl (meth)acrylate are particularly preferable.

Furthermore, a compound having a fluorine atom, such as trifluoroethyl (meth)acrylate, pentafluoroethyl (meth)acrylate, (perfluorobutyl)ethyl (meth)acrylate, perfluorobutylhydroxypropyl (meth)acrylate, (perfluorohexyl)ethyl (meth)acrylate, octafluoropentyl (meth)acrylate, perfluorooctylethyl (meth)acrylate, and tetrafluoropropyl (meth)acrylate, may be included as the curable compound. By incorporation of these compounds, the coatability can be improved.

In the quantum dot layer 32, the amount of the binder is not particularly limited, and but may be appropriately set, depending on the type of the curable compound to be used, the thickness of the quantum dot layer 32, and the like.

According to the studies of the present inventors, the amount of the binder is preferably 90 to 99.9 parts by mass, and more preferably 92 to 99 parts by mass, with respect to 100 parts by mass of the total amount of the quantum dot layer 32.

The thickness of the quantum dot layer 32 is not particularly limited, but is preferably 5 to 200 µm, and more preferably 10 to 150 µm.

It is preferable to set the thickness of the quantum dot layer 32 to 5 µm or more, for example, in views that good light emitting characteristics are obtained.

It is preferable to set the thickness of the quantum dot layer 32 to 200 µm or less, for example, in views that the quantum dot film 30 can be prevented from being unnecessarily thick, a quantum dot film 30 having good handleability is obtained, or a quantum dot layer 32 having sufficient curability can be formed. The quantum dot layer 32 having sufficient curability means a quantum dot layer 32 having no aggregation peeling.

The quantum dot layer 32, that is, the quantum dot film 30 may be formed by a known method for forming a layer formed of organic compounds, depending on the forming materials of the quantum dot layer 32.

First, the two gas barrier films 10 were manufactured as described above.

On the other hand, a coating composition (polymerizable composition) which becomes the quantum dot layer 32 is prepared by dispersing quantum dots in the curable compound which becomes a binder. This coating composition may also contain a photopolymerization initiator, a surfactant, or the like, if desired.

When the two gas barrier films 10 are manufactured and the coating composition is prepared, the coating composition is applied onto the surface organic layer 18 of any one of the gas barrier films 10.

Then, the other gas barrier film 10 is laminated to the surface organic layer 18, facing the coating composition.

When the coating composition which becomes the quantum dot layer 32 is sandwiched between the gas barrier films 10, the curable compound which becomes a binder in the coating composition is polymerized by the irradiation with ultraviolet rays, and thus, a quantum dot layer 32 is formed, thereby manufacturing a quantum dot film 30. Since the curable compound which becomes a binder, the (meth) acryloyl group of the phosphoric acid compound and/or the (meth)acryloyl group of the silane coupling agent in the surface organic layer 18, and the terminal (meth)acryloyl group of the side chain of the urethane polymer are reacted with and bonded to each other as described above when the curable compound which becomes the binder is polymerized, the quantum dot layer 32 and the surface organic layer 18 are adhered to each other with high adhesiveness. As the curable compound which becomes the binder, (meth)acrylate is preferable.

The production of such a quantum dot film 30 is also preferably carried out by R-to-R.

Hereinabove, the functional composite film and the quantum dot film of the present invention are described in detail, but the present invention is not limited to Examples. It is certain that various modifications or alterations may be made within a range not departing from the gist of the present invention.

EXAMPLES

Hereinbelow, the present invention will be described in more detail with reference to specific Examples of the present invention.

Example 1

<Manufacture of Gas Barrier Film 10>

A gas barrier film 10 having an underlying organic layer 14, an inorganic layer 16, and a surface organic layer 18 on a support 12 was manufactured.

As the support 12, a PET film (COSMO SHINE A4300 manufactured by Toyobo Co., Ltd.) having a width of 1,000 mm, a thickness of 50 µm, and a length of 100 m was used.

<<Formation of Underlying Organic Layer 14>>

TMPTA (manufactured by Daicel-Cytec Co., Ltd.) and a photopolymerization initiator (ESACURE KTO 46 manufactured by Lamberti S.p.A.) were prepared and weighed such that the mass ratio thereof was 95:5. These were dissolved in methyl ethyl ketone (MEK) such that the concentration of the solid content was 15% by mass, thereby preparing a coating composition for forming an underlying organic layer 14.

The coating composition for forming a underlying organic layer 14 was loaded in a predetermined position of a coating layer of a film forming device using general R-to-R, including the coating unit with a die coater, a drying unit using warm air, and a curing unit using irradiation with ultraviolet rays. Further, a roll formed by winding the support 12 in a roll shape was loaded in a predetermined position of the film forming device, and the support 12 was inserted through a predetermined transport path.

In the film forming device, while transporting the support 12 in the longitudinal direction, the coating composition was applied using the die coater, and passed through a drying unit at 50° C. for 3 minutes. Thereafter, the coating composition was cured by the irradiation with ultraviolet rays (integrated irradiation dose of about 600 mJ/cm$^2$), and wound to obtain a roll having the underlying organic layer 14 formed on the support 12. The thickness of the underlying organic layer 14 was 1 µm.

<<Formation of Inorganic Layer 16>>

The roll of the support 12 having the underlying organic layer 14 formed thereon was loaded in a predetermined position of a general CVD film forming device which performs film formation by CCP-CVD (capacity coupled plasma CVD) using R-to-R, and the support 12 was inserted through a predetermined transport path.

In this CVD film forming device, while the support 12 having the underlying organic layer 14 formed thereon was transported in the longitudinal direction, a silicon nitride film as the inorganic layer 16 was formed on the underlying organic layer 14.

As raw material gases, a silane gas (flow rate of 160 sccm), an ammonia gas (flow rate of 370 sccm), a hydrogen gas (flow rate of 590 sccm), and a nitrogen gas (flow rate of 240 sccm) used. As a power supply, a high-frequency power supply having a frequency of 13.56 MHz was used, and a plasma excitation electric power was set to 800 W. The film forming pressure was set to 40 Pa. The film thickness of the inorganic layer 16 was 50 nm.

<<Formation of Surface Organic Layer 18>>

A UV-curable urethane polymer (ACRIT 8UH-1006 manufactured by Taisei Fine Chemical Co., Ltd.), a urethane polyester (VYLON UR1410 manufactured by Toyobo Co., Ltd.), a phosphoric acid compound (bis[2-(methacryloyloxy)ethyl] phosphate manufactured by Sigma Aldrich (CAS32435-46-4)), and a silane coupling agent (KBM5103 manufactured by Shin-Etsu Silicone Co., Inc.) were weighed such that the mass ratio of the UV-curable urethane polymer: the urethane polyester:the phosphoric acid compound:the silane coupling agent was 50:15:25:10, and dissolved in MEK such that the concentration of the solid content was 2% by mass, thereby preparing a coating composition for forming the surface organic layer 18.

Furthermore, ACRIT 8UH-1006 used as the UV-curable urethane polymer is a ultraviolet-curable urethane polymer having a weight-average molecular weight of 20,000 and a double bond equivalent of 366 g/mol, which has a urethane polymer as the main chain and a side chain having a (meth)acryloyl group at a terminal.

The coating composition for forming the surface organic layer 18 was loaded in a predetermined position of a coating unit of a film forming device using general R-to-R, including the coating unit with a die coater and a drying zone using heating. Further, a roll of the support 12 having the inorganic layer 16 formed thereon was loaded in a predetermined position of the film forming device, and inserted through a predetermined transport path.

In the film forming device, while transporting the support 12 in the longitudinal direction, the coating composition was applied using the die coater, passed through a drying unit at 110° C. for 3 minutes, and wound. As described above, the surface organic layer 18 is thermally cured during the drying. Thus, a gas barrier film 10 having the support 12, the underlying organic layer 14, the inorganic layer 16, and the surface organic layer 18 as shown in FIG. 1 was manufactured. In addition, the amount of the coating composition to be applied was set to 5 mL (liters)/m². The thickness of the surface organic layer 18 thus formed was 100 nm.

Two rolls of the gas barrier film 10 were manufactured.

<Manufacture of Quantum Dot Film>

A composition having the following compositional ratio was prepared.

| | |
|---|---|
| Toluene dispersion liquid having quantum dots 1 (with a light emission wavelength of 535 nm) | 10 parts by mass |
| Toluene dispersion liquid having quantum dots 2 (with a light emission wavelength of 630 nm) | 10 parts by mass |

-continued

| | |
|---|---|
| Lauryl methacrylate | 80.8 parts by mass |
| Trimethylolpropane triacrylate | 18.2 parts by mass |
| Photopolymerization initiator (IRGACURE 819 manufactured by BASF) | 1 part by mass |

This composition was filtered with a PP-made filter having a pore diameter of 0.2 μm, and then dried under reduced pressure for 30 minutes to prepare a coating composition which would become the quantum dot layer 32.

The coating composition for forming the quantum dot layer 32 was loaded in a predetermined position of a coating unit of a film forming device using general R-to-R, including the coating unit with a die coater, a laminator, and a curing unit using irradiation with ultraviolet rays.

Furthermore, one roll was loaded in a predetermined position of the film forming device, and the gas barrier film 10 was inserted through a predetermined transport path which was inserted through the coating unit, the laminator, and the curing unit. Incidentally, one roll was loaded in a predetermined position of the film forming device, and the gas barrier film 10 was inserted through a predetermined transport path which, was inserted through the laminator and the curing unit. The gas barrier film 10 that passed through the coating unit was loaded in the film forming device such that the surface organic layer 18 became the surface on which the coating composition was applied. Further, the two gas barrier films 10 were loaded in the film forming device such that the surface organic layers 18 faced each other.

While transporting the two gas barrier films 10 at a transport speed of 1 m/min and a tension of 60 N/m, the coating composition was applied onto the gas barrier film 10 that passed through the coating unit to form a coating film having a thickness of 50 μm.

Subsequently, the gas barrier film 10 having the coating film formed thereon was transported while being supported by a backup roller, and the other gas barrier film 10 was laminated thereon by the laminator.

Furthermore, while the coating film was transported in a state where the film was sandwiched between the two gas barrier films, the coating composition was cured by the irradiation with ultraviolet rays in the curing unit, and the quantum dot layer 32 was formed and wound. Thus, the quantum dot film 30 as shown in FIG. 2, in which the quantum dot layer 32 was sandwiched between the two gas barrier films 10, was manufactured.

In addition, the film thickness of the formed quantum dot layer 32 was 50 μm. Further, by using a 160 W/cm air-cooled metal halide lamp (manufactured by Eye Graphics Co., Ltd.) in the curing unit, the integrated irradiation dose of ultraviolet rays was about 2,000 mJ/cm².

Example 2

In the same manner as in Example 1, except that the thickness of the surface organic layer 18 was set to 10 nm, gas barrier films 10 were manufactured. Further, in the same manner as in Example 1, except that these gas barrier films 10 were used, a quantum dot film 30 was manufactured.

Example 3

In the same manner as in Example 1, except that the thickness of the surface organic layer 18 was set to 1,000 nm, gas barrier films 10 were manufactured. Further, in the same manner as in Example 1, except that these gas barrier films 10 were used, a quantum dot film 30 was manufactured.

Example 4

In the same manner as in Example 1, except that a photopolymerization initiator (ESACURE KTO46 manufactured by Lamberti SpA) was added, a coating composition for forming a surface organic layer 18 was prepared. The amounts of the respective components to be added were set such that the mass ratio of the UV curable urethane polymer:the urethane polyester:the phosphoric acid compound:the silane coupling agent:the photopolymerization initiator was 48:15:25:10:2.

In the same manner as in Example 1, except that this coating composition was used to form a surface organic layer 18, gas barrier films 10 were manufactured. Further, in the same manner as in Example 1, except that these gas bather films 10 were used, a quantum dot film 30 was manufactured.

Example 5

In the same manner as in Example 1, except at a lubricant (CAB-SiL Grade M5 manufactured by CABOT) was added, a coating composition for forming a surface organic layer 18 was prepared. The amounts of the respective components to be added were set such that the mass ratio of the UV-curable urethane polymer:the urethane polyester:the phosphoric acid compound:silane coupling agent:the lubricant was 49.5:15:25:10:0.5.

In the same manner as in Example 1, except that this coating composition was used to form a surface organic layer 18, gas barrier films 10 were manufactured. Further, in the same manner as in Example 1, except that these gas barrier films 10 were used, a quantum dot film 30 was manufactured.

Example 6

In the same manner as in Example 1, except that the same photopolymerization initiator as that in Example 4 and the same lubricant as in Example 5 were added, a coating composition for forming a surface organic layer 18 was prepared. The amounts of the respective components to be added were set such that the mass ratio of the UV-curable urethane polymer:the urethane polyester:the phosphoric acid compound:silane coupling agent:the photopolymerization initiator:the lubricant was 47.5:15:25:10:2:0.5.

In the same manner as in Example 1, except that this coating composition was used to form a surface organic layer 18, gas barrier films 10 were manufactured. Further, in the same manner as in Example 1, except that these gas barrier films 10 were used, a quantum dot film 30 was manufactured.

Example 7

In the same manner as in Example 1, except that blast drying was performed at room temperature as a temperature in the drying zone, and then ultraviolet rays were irradiated at an integrated irradiation dose of about 2,000 mJ/cm$^2$ in the formation of the surface organic layer 18, gas barrier films 10 were manufactured. That is, in the present example, in the same manner as in Example 1, except that the surface organic layer 18 was cured with ultraviolet rays, the gas barrier films 10 were manufactured.

In addition, in the same manner as in Example 1, except that these gas barrier films 10 were used, a quantum dot film 30 was manufactured.

Example 8

In the same manner as in Example 1, except that the drying temperature in the drying zone was set to 60° C. in the formation of the surface organic layer 18, gas barrier films 10 were manufactured. In addition, in the same manner as in Example 1, except that these gas barrier films 10 were used, a quantum dot film 30 was manufactured.

Example 9

In the same manner as in Example 1, except that the drying temperature in the drying zone was set to 130° C. in the formation of the surface organic layer 18, gas barrier films 10 were manufactured. In addition, in the same manner as in Example 1, except that these gas barrier films 10 were used, a quantum dot film 30 was manufactured.

Example 10

In the same manner as in Example 1, except that a phosphoric acid compound was not added, a coating composition for forming a surface organic layer 18 was prepared. The amounts of the respective components to be added were set such that the mass ratio of the UV curable urethane polymer:the urethane polyester:the silane coupling agent was 50:15:35.

In the same manner as in Example 1, except that this coating composition was used to form a surface organic layer 18, gas barrier films 10 were manufactured. Further, in the same manner as in Example 1, except that these gas barrier films 10 were used, a quantum dot film 30 was manufactured.

Example 11

An inorganic layer 16 was formed with aluminum oxide. Further, the inorganic layer 16 was formed by reactive sputtering using aluminum as a target with a sputtering apparatus using general R-to-R. An argon gas was used as the discharge gas, and an oxygen gas was used as the reaction gas. The amounts of the respective gases to be supplied were 50 sccm for the argon gas and 200 sccm for the oxygen gas. The forming pressure was set to $1.5 \times 10^{-1}$ Pa and the input power was set to 2,300 W. The film thickness of the inorganic layer 16 was 50 nm.

Further, in the same manner as in Example 1, except that a silane coupling agent was not added, a coating composition for forming a surface organic layer 18 was prepared. The amounts of the respective components to be added were set such that the mass ratio of the UV curable urethane polymer:the urethane polyester:the phosphoric acid compound was 50:15:35.

In the same manner as in Example 1, except that aluminum oxide was used for the inorganic layer 16 and this coating composition was used to for a surface organic layer 18, gas barrier films 10 were manufactured. Further, in the same manner as in Example 1, except that these gas barrier films 10 were used, a quantum dot film 30 was manufactured.

Comparative Example 1

In the same manner as in Example 1, except that the surface organic layer 18 was not used, gas barrier films were manufactured. Further, in the same manner as in Example 1, except that these gas barrier films were used, a quantum dot film was manufactured.

Comparative Example 2

In the same manner as in Example 1, except that the phosphoric acid compound and the silane coupling agent were not added, a coating composition for forming a surface organic layer was prepared. The amounts of the respective components to be added were set such that the mass ratio of the UV-curable urethane polymer:the urethane polyester was 70:30.

In the same manner as in Example 1, except that this coating composition was used to form a surface organic layer, gas barrier films were manufactured. Further, in the same manner as in Example 1, except that these gas barrier films were used, a quantum dot film was manufactured, Comparative Example 3

In the same manner as in Example 1, except that the UV curable urethane polymer and the urethane polyester were not added, a coating composition for forming a surface organic layer was prepared. The amounts of the respective components to be added were set such that the mass ratio of the phosphoric acid compound:the silane coupling, agent was 75:25.

In the same manner as in Example 1, except that this coating composition was used to form a surface organic layer, gas carrier films were manufactured. Further, in the same manner as in Example 1, except that these gas barrier films were used, a quantum dot film was manufactured.

Comparative Example 4

In the same manner as in Example 1, except that the UV curable urethane polymer was not added, a coating composition for forming a surface organic layer was prepared. The amounts of the respective components to be added were set such that the mass ratio of the urethane polyester:the phosphoric acid compound:the silane coupling agent was 65:25:10.

In the same manner as in Example 1, except that this coating composition was used to form a surface organic layer, gas barrier films were manufactured. Further, in the same manner as in Example 1, except that these gas barrier films were used, a quantum dot film was manufactured.

Comparative Example 5

In the same manner as in Example 1, except that a urethane polyester was not added, a coating composition for forming a surface organic layer 18 was prepared. The amounts of the respective components to be added were set such that the mass ratio of the UV curable urethane polymer:the phosphoric acid compound:the silane coupling agent was 65:25:10.

In the same manner as in Example 1, except that this coating composition was used to form a surface organic layer, gas barrier films were manufactured. Further, in the same manner as in Example 1, except that these gas barrier films were used, a quantum dot film 30 was manufactured.

[Evaluation]

The gas barrier film 10 and the quantum dot film thus manufactured were evaluated in the following manner.

<Gas Barrier Properties>

Prior to the manufacture of quantum dot film, the water vapor permeability [g/(m$^2$·day)] of the manufactured gas barrier film 10 was measured by a calcium corrosion method (the method described in JP2005-283561A). The conditions of a constant temperature/constant humidity treatment were as follows: a temperature of 45° C. and a relative humidity of 90RH %.

<Adhesiveness of Surface Organic Layer 18>

Prior to the manufacture of the quantum dot film, the adhesiveness of the surface organic layer 18 of the gas barrier film 10 was evaluated using a cross-cut peeling test in accordance with JIS K5400.

The surface organic layer 18 of the gas barrier film 10 was cut in at the entering angle of 90° toward the film surface at intervals of 1 mm, thereby producing 100 cross-cuts (100 grids) at intervals of 1 mm. On the surface thereof, Mylar tape with a width of 2 cm (manufactured by Nitto Denko, polyester tape, No. 31 B) was attached, and then was peeled off using a tape peeling testing machine. The number of the grids (the number of the cross-cuts) on which the surface organic layer 18 remained was counted.

Evaluation was performed in the following manner.

A case where all of 100 grids remained was evaluated as A;

a case where 90 to 99 grids remained was evaluated as B;

a case where 80 to 89 grids remained was evaluated as C;

a case where 70 to 79 grids remained was evaluated as D; and a case where 69 or less grids remained was evaluated as E.

<Adhesiveness of Quantum Dot Layer>

The adhesiveness of the quantum dot layer 32 was measured by a 180° peeling test method in accordance with JIS Z 0237 2009. Specifically, a sample was cut into 25×50 mm strips, 5 mm of the upper portion was peeled in the longitudinal direction and the remainder was peeled with a peel tester to measure the adhesive force.

A case where the adhesive three was more than 8 N/25 mm was evaluated as A;

a case where the adhesive force was more than 6 N/25 mm and 8 N/25 mm or less was evaluated as B;

a case where the adhesive force was more than 4 N/25 mm and 6 N/25 mm or less was evaluated as C;

a case where the adhesive force was more than 2 N/25 mm and 4 N/25 mm or less was evaluated as D; and a case where the adhesive force was 2 N/25 mm or less was evaluated as E.

<Measurement of Edge Brightness>

In order to confirm that there was no peeling due to the processing, the following brightness measurement was carried out.

The manufactured quantum dot film was cut into a predetermined size, using a Thomson blade.

A commercially available tablet terminal (Kindle Fire HDX 7" manufactured by Amazon) including a blue light source in a backlight unit was disassembled to extract the backlight unit. The wavelength conversion film that had been cut into a predetermined size was placed on the light guide plate of the backlight unit, and two prism sheets taken out from the tablet terminal were arranged to overlap such that the directions of the concave and convex surface patterns were orthogonally crossed.

The backlighting unit was switched on and the brightness was measured with a brightness meter (SR3 manufactured by TOPCON Corporation installed at a position 740 mm apart in a vertical direction from the surface of the backlight unit at five points at constant intervals on both the diagonal lines from the edge. Further, the average value of the six points on the center and the average value of the four points on the edge were calculated, and the reduction rate of the average value on the edge relative to the average value of the center was calculated.

A case where the reduction rate of brightness is 5% or less was evaluated as A;

a case where the reduction rate of brightness was more than 5% and 10% or less was evaluated as B;

a case where the reduction rate of brightness was more than 10% and 20% or less was evaluated as C;

a case where the reduction rate of brightness was more than 20% and 30% or less was evaluated as D; and a case where the reduction rate of brightness was more than 30% was evaluated as E.

The results of the above evaluation are shown in the following table.

temperature, that is, the temperature at which the thermal curing of the surface organic layer is performed is high, the adhesiveness of the quantum dot layer 32 is very high and there is very little edge reduction in brightness. In Example 10 (with inorganic layer 16 being formed of silicon nitride) in which only the silane coupling agent out of the phosphoric acid compound and the silane coupling agent is added, and in Example 11 in which the inorganic layer 16 is formed of aluminum oxide and the phosphoric acid compound is added, the compatibility between the inorganic layer 16 and the surface organic layer 18 is good, and thus, the adhesiveness of the gas barrier films 10 is very high.

Furthermore, in Example 3 in which the surface organic layer 18 is thick, the adhesiveness is low, as compared with Example 1 and the like, but high gas barrier properties are obtained and the edge brightness is also good. Further, in Example 8 in which the drying temperature of the surface

TABLE 1

| | Surface organic layer | | | | | | | | | | Evaluation | | | |
| | | | | | | | | | | | Barrier film | | Quantum dot film | |
| | Inorganic layer | Thickness [nm] | Urethane | Urethane polyester | Phosphoric acid | Silane coupling agent | Photopolymerization initiator | Lubricant | Drying [° C.] | Curing | Barrier properties | Adhesiveness | Adhesiveness | Edge brightness |
|---|---|---|---|---|---|---|---|---|---|---|---|---|---|---|
| Example 1 | SiN | 100 | Included | Included | Included | Included | Not included | Not included | 110 | Heat | $1.1 \times 10^{-4}$ | B | B | B |
| Example 2 | SiN | 10 | Included | Included | Included | Included | Not included | Not included | 110 | Heat | $4 \times 10^{-4}$ | B | A | B |
| Example 3 | SiN | 1,000 | Included | Included | Included | Included | Not included | Not included | 110 | Heat | $8 \times 10^{-5}$ | C | C | B |
| Example 4 | SiN | 100 | Included | Included | Included | Included | Included | Not included | 110 | Heat | $1.2 \times 10^{-4}$ | B | A | A |
| Example 5 | SiN | 100 | Included | Included | Included | Included | Not included | Included | 110 | Heat | $1.2 \times 10^{-4}$ | B | A | A |
| Example 6 | SiN | 100 | Included | Included | Included | Included | Included | Included | 110 | Heat | $1.3 \times 10^{-4}$ | B | A | A |
| Example 7 | SiN | 100 | Included | Included | Included | Included | Not included | Not included | At room temperature | UV | $1.1 \times 10^{-4}$ | A | C | C |
| Example 8 | SiN | 100 | Included | Included | Included | Included | Not included | Not included | 60 | Heat | $2.8 \times 10^{-4}$ | C | C | C |
| Example 9 | SiN | 100 | Included | Included | Included | Included | Not included | Not included | 130 | Heat | $3 \times 10^{-4}$ | B | A | A |
| Example 10 | SiN | 100 | Included | Included | Not included | Included | Not included | Not included | 110 | Heat | $1.2 \times 10^{-4}$ | A | B | B |
| Example 11 | SiN | 100 | Included | Included | Included | Not included | Not included | Not included | 110 | Heat | $1.8 \times 10^{-4}$ | A | B | B |
| Comparative Example 1 | SiN | | | | | — | | | | | $5 \times 10^{-2}$ | — | E | E |
| Comparative Example 2 | SiN | 100 | Included | Included | Not included | Not included | Not included | Not included | 110 | Heat | $1.5 \times 10^{-4}$ | D | E | E |
| Comparative Example 3 | SiN | 100 | Not added | Not added | Included | Included | Not included | Not included | 110 | Heat | $4.5 \times 10^{-2}$ | E | D | E |
| Comparative Example 4 | SiN | 100 | Not added | Included | Included | Included | Not included | Not included | 110 | Heat | $2 \times 10^{-4}$ | B | E | E |
| Comparative Example 5 | SiN | 100 | Included | Not added | Included | Included | Not included | Not included | 110 | Heat | $1.5 \times 10^{-3}$ | E | D | E |

In the section of "curing" of the surface organic layer, heat denotes that the surface organic layer is thermally cured, and UV denotes that the surface organic layer is cured with ultraviolet rays. In the barrier properties, the unit of water vapor permeability is [g/(m² · day)].

As shown in Table 1, the gas barrier film 10 of the present invention has excellent gas barrier properties and adhesiveness of the surface organic layer 18, and the quantum dot film 30 of the present invention using the gas barrier film is a quantum dot film 30 having good adhesiveness of the quantum dot layer 32 and little edge reduction in brightness. In particular, in Examples 4 to 6 in which a photopolymerization initiator and/or a lubricant is/are added to the surface organic layer 18, the adhesiveness of the quantum dot layer 32 is very high and there is very little edge reduction in brightness. Further, in Example 9 in which the drying organic layer 18, that is, the temperature at which the surface organic layer 18 is performed is low, the effect is not sufficient during the thermal curing, and as compared with Example 1 and the like, the adhesiveness and the like are low, but as compared with Comparative Examples regarding the products in the related art, the adhesiveness and the like are excellent. Similarly, in Example 7 in which the curing of the surface organic layer 18 is performed by ultraviolet curing, the effect from the thermal curing is not obtained, and as compared with Example 1 and the like, the adhesiveness and the edge brightness of the quantum dot film are low, but as compared with Comparative Examples regarding the products in the related art, the adhesiveness and the edge brightness of the quantum dot film are excellent and the adhesiveness of the gas barrier films 10 is very high.

In contrast, in Comparative Example 1 in which surface organic layer 18 is not included, the inorganic layer 16 is damaged, the gas barrier properties are low, and the adhesiveness to the quantum dot layer 32 is also low. Further, in Comparative Example 2 in which the surface organic layer does not contain the phosphoric acid compound and the silane coupling agent, it is thought that the adhesiveness is low, and as a result, the edge brightness of the quantum dot film is reduced. In Comparative Examples 3 and 5 in which the surface organic layer does not contain the curable urethane polyester, it is thought that since the function of protecting the inorganic layer with the surface organic layer of the inorganic layer is low, the gas barrier properties are low, and since the adhesiveness are low, the edge brightness of the quantum dot film is reduced. In addition, in Comparative Example 4 in which the surface organic layer does not contain the UV-curable urethane polymer, it is thought that the adhesiveness of the surface organic layer is good, but the adhesiveness to the quantum dot layer is low, and as a result, the edge brightness of the quantum dot film is reduced.

From the above results, the effect of the present invention is apparent.

The present invention can suitably be used in the production of a functional laminated film such as a quantum dot film or in the production of a liquid crystal display.

EXPLANATION OF REFERENCES

10 Gas barrier film
12 Support
14 Underlying organic layer
16 Inorganic layer
18 Surface organic layer
30 Quantum dot film
32 Quantum dot layer

What is claimed is:

1. A functional composite film comprising:
   one or more combinations of an inorganic layer and an organic layer which becomes an underlying base of the inorganic layer on a support, and having the outermost surface thereon with the organic layer thereon,
   wherein the organic layer on the outermost surface is formed using an ultraviolet-curable urethane polymer having a weight-average molecular weight of 5,000 to 30,000 and a double bond equivalent of 300 g/mol or more, which has a urethane polymer as the main chain and a side chain having a (meth)acryloyl group at a terminal; a curable urethane polyester; and both a phosphoric acid compound containing two or less (meth)acryloyl groups and a silane coupling agent containing one (meth)acryloyl group, and
   wherein a content of the ultraviolet-curable urethane polymer is 35% to 55% by mass, in a solid content of a polymerizable composition for forming the organic layer on the outermost surface.

2. The functional composite film according to claim 1, wherein the thickness of the organic layer on the outermost surface is 10 to 1,000 nm.

3. The functional composite film according to claim 1, wherein the organic layer on the outermost surface includes a photopolymerization initiator.

4. The functional composite film according to claim 1, wherein the organic layer on the outermost surface is formed by thermal curing.

5. The functional composite film according to claim 1, wherein the organic layer on the outermost surface includes a lubricant.

6. The functional composite film according to claim 5, wherein the lubricant is a silicon particle.

7. The functional composite film according to claim 1, wherein the inorganic layer is formed of any one of silicon oxide, silicon nitride, silicon oxynitride, aluminum oxide, and a mixture of two or more thereof.

8. A quantum dot film wherein a quantum dot layer formed by dispersing quantum dots in a binder is sandwiched between the functional composite films according to claim 1, with the organic layer on the outermost surface being on the inside.

9. The quantum dot film according to claim 8, wherein the binder is formed by the polymerization of a compound having a weight-average molecular weight of 500 or less.

10. The quantum dot film according to claim 8, wherein the binder is a (meth)acrylic resin.

* * * * *